(12) United States Patent
Buei et al.

(10) Patent No.: US 9,181,443 B2
(45) Date of Patent: Nov. 10, 2015

(54) RESIN FOR AQUEOUS PIGMENT DISPERSION, AQUEOUS PIGMENT DISPERSION, INK JET RECORDING INK, AND METHOD FOR PRODUCING AQUEOUS PIGMENT DISPERSION

(75) Inventors: Hiroyuki Buei, Kitamoto (JP); Yoshinosuke Shimamura, Ageo (JP); Shinichi Okada, Ina-machi (JP); Kenji Nasu, Akashi (JP); Takashi Yoshinari, Kakogawa (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 13/441,276

(22) Filed: Apr. 6, 2012

(65) Prior Publication Data

US 2012/0325111 A1 Dec. 27, 2012

(30) Foreign Application Priority Data

Apr. 6, 2011 (JP) ................................. 2011-084690

(51) Int. Cl.
| | |
|---|---|
| *C09D 11/10* | (2014.01) |
| *C07D 307/60* | (2006.01) |
| *C09D 11/106* | (2014.01) |
| *C09D 11/326* | (2014.01) |

(52) U.S. Cl.
CPC ............ *C09D 11/106* (2013.01); *C09D 11/326* (2013.01)

(58) Field of Classification Search
CPC .............................. C09D 11/10; C07D 307/60
USPC ........................... 524/548, 401; 106/31.6, 498
See application file for complete search history.

(56) References Cited

U.S. PATENT DOCUMENTS

2006/0219133 A1* 10/2006 Sakamoto et al. .......... 106/31.65
2009/0188054 A1*  7/2009 Dyllick-Brenzinger et al. ............................ 8/115.6

FOREIGN PATENT DOCUMENTS

| JP | 09-100428 A | 4/1997 |
|---|---|---|
| JP | 10-158562 A | 6/1998 |
| JP | 2000-265083 A | 9/2000 |
| JP | 2003-226832 A | 8/2003 |
| JP | 2003226832 A * | 8/2003 |
| JP | 2005-048014 A | 2/2005 |
| JP | 2008-222980 A | 9/2008 |
| JP | 2009-067911 A | 4/2009 |

OTHER PUBLICATIONS

Machine Translation of JP 2003-226832A.*

* cited by examiner

*Primary Examiner* — Ling Choi
*Assistant Examiner* — Ronald Grinsted
(74) *Attorney, Agent, or Firm* — Westerman, Hattori, Daniels & Adrian, LLP

(57) ABSTRACT

A resin for aqueous pigment dispersion that allows the production of an aqueous pigment dispersion for ink jet recording that contains only a few coarse particles and has excellent ejection stability, an aqueous pigment dispersion containing the resin for aqueous pigment dispersion, an ink jet recording ink, and a method for producing an aqueous pigment dispersion. A resin for aqueous pigment dispersion produced by copolymerization of a composition that contains (a) one or two or more compounds selected from the group consisting of alkenylsuccinic acids, alkenylsuccinic anhydrides, alkylsuccinic acids, and alkylsuccinic anhydrides, and (b) a styrene monomer, wherein the (a) component constitutes 5% by mass or more and the (b) component constitutes 30% by mass or more of the total amount of all the monomer component(s) and the (a) component of the composition.

8 Claims, No Drawings

RESIN FOR AQUEOUS PIGMENT DISPERSION, AQUEOUS PIGMENT DISPERSION, INK JET RECORDING INK, AND METHOD FOR PRODUCING AQUEOUS PIGMENT DISPERSION

TECHNICAL FIELD

The present invention relates to a resin for aqueous pigment dispersion, an aqueous pigment dispersion, an ink jet recording ink, and a method for producing an aqueous pigment dispersion.

BACKGROUND ART

Aqueous pigment inks for ink jet recording that contain a pigment dispersed in an aqueous medium, a resin having an anionic group, and a basic compound have been proposed as ink jet recording inks that can produce recorded images having high water resistance and light fastness on recording materials.

Since pigments themselves are insoluble in ink solvents (such as water and hydrophilic organic solvents), pigments must be finely divided and dispersed. However, coarse particles that cannot be finely divided and remain in an ink solvent or coarse particles that are formed by aggregation as a result of destabilization associated with particle size reduction may cause clogging in an ink flow channel (orifice) of an ink jet printer head and consequently ink ejection failure.

In recent years, the application of an ink jet recording method has rapidly spread not only in offices but also in the field of various traditional printing industries. Thus, high-speed printing and long-term ejection stability has become important. Thus, the demand for ink jet inks that cause no clogging and can be stably ejected has sharply increased.

Methods for removing coarse particles from liquid after dispersion by a physical method, such as filtration or centrifugation, are proposed (Patent Literatures 1 and 2) as means for solving these problems but do not entirely satisfy the recent demands described above.

Coarse particles are preferably reduced before these downstream processes following dispersion rather than by the downstream processes in terms of production efficiency and production yield. The applicants proposed a method for producing an aqueous pigment dispersion for ink jet recording, which involves a kneading process for kneading a mixture of a pigment, a resin, a basic compound, and a wetting agent to produce a colored kneaded product (Patent Literatures 3 and 4). In the kneading process, the pigment is crushed into fine particles, and simultaneously the surface of crushed pigments is coated with the resin. Thus, this method is effective in reducing coarse particles.

However, even these production methods do not entirely satisfy the recent demands for fewer coarse particles.

In order to improve pigment dispersion, a constituent having a long-chain alkyl group is added to a dispersed resin so as to improve the adsorption of a hydrophobic moiety on a pigment (Patent Literatures 5, 6, and 7).

CITATION LIST

Patent Literature

PTL 1 Japanese Unexamined Patent Application Publication No. 2008-222980
PTL 2 Japanese Unexamined Patent Application Publication No. 2009-067911
PTL 3 Japanese Unexamined Patent Application Publication No. 2003-226832
PTL 4 Japanese Unexamined Patent Application Publication No. 2005-048014
PTL 5 Japanese Unexamined Patent Application Publication No. 9-100428
PTL 6 Japanese Unexamined Patent Application Publication No. 10-158562
PTL 7 Japanese Unexamined Patent Application Publication No. 2000-265083

SUMMARY OF INVENTION

Technical Problem

However, even these methods could not effectively reduce coarse particles, although the methods can improve pigment dispersion.

It is an object of the present invention to provide a resin for aqueous pigment dispersion that allows the production of an aqueous pigment dispersion for ink jet recording that contains only a few coarse particles and has excellent ejection stability, an aqueous pigment dispersion containing the resin for aqueous pigment dispersion, an ink jet recording ink, and a method for producing an aqueous pigment dispersion.

Solution to Problem

The present inventors completed the present invention by finding that, in an aqueous ink for ink jet recording that contains a pigment, a resin, and a basic compound, an aqueous pigment dispersion that contains a resin for aqueous pigment dispersion produced by copolymerization of a particular compound is effective in maintaining a certain pigment concentration and ensuring excellent long-term storage stability and ejection stability.

(1) A resin for aqueous pigment dispersion according to the present invention is produced by copolymerization of a composition that contains (a) one or two or more compounds selected from the group consisting of alkenylsuccinic acids, alkenylsuccinic anhydrides, alkylsuccinic acids, and alkylsuccinic anhydrides, and (b) a styrene monomer, wherein the (a) component constitutes 5% by mass or more and the (b) component constitutes 30% by mass or more of the total amount of all the monomer component(s) and the (a) component of the composition.

(2) In a resin for aqueous pigment dispersion according to the present invention, preferably, the composition further contains (c) a monomer having an $\alpha,\beta$-ethylenically unsaturated bond and an anionic group, and the resin has an acid value in the range of 50 to 300 mgKOH/g.

(3) In a resin for aqueous pigment dispersion according to the present invention, the number of carbon atoms of the alkenyl group of the alkenylsuccinic acid and the alkenylsuccinic anhydride, and the alkyl group of the alkylsuccinic acid and the alkylsuccinic anhydride in the (a) component is preferably four or more for each group.

(4) An aqueous pigment dispersion according to the present invention contains the resin for aqueous pigment dispersion described above, a pigment, and a basic compound.

(5) Preferably, an aqueous pigment dispersion according to the present invention is used for ink jet recording, and the resin for aqueous pigment dispersion has a mass-average molecular weight in the range of 5000 to 30000.

(6) In an aqueous pigment dispersion according to the present invention, the basic compound is preferably an alkali metal hydroxide.

(7) An ink jet recording ink according to the present invention contains the aqueous pigment dispersion.

(8) A method for producing an aqueous pigment dispersion according to the present invention includes a kneading process for kneading a mixture of the resin for aqueous pigment dispersion, a pigment, and a basic compound to produce a pigment dispersion having a solid content of 50% by mass or more and a mixing process for mixing and agitating the pigment dispersion in an aqueous medium.

(9) In a method for producing an aqueous pigment dispersion according to the present invention, the basic compound is preferably an alkali metal hydroxide.

Advantageous Effects of Invention

A resin for aqueous pigment dispersion according to the present invention allows the production of an aqueous pigment dispersion that contains only a few coarse particles and has excellent ejection stability. An ink jet recording ink according to the present invention that contains the aqueous pigment dispersion has long-term storage stability and ejection stability as well as excellent light fastness and water resistance as a pigment ink. An aqueous pigment dispersion that contains only a few coarse particles and has excellent ejection stability can be easily and efficiently produced by a method for producing an aqueous pigment dispersion according to the present invention.

DESCRIPTION OF EMBODIMENTS

The present invention will be further illustrated with embodiments below.

Resin

A resin for aqueous pigment dispersion according to the present invention is produced by copolymerization of a composition that contains (a) one or two or more compounds selected from the group consisting of alkenylsuccinic acids, alkenylsuccinic anhydrides, alkylsuccinic acids, and alkylsuccinic anhydrides, and (b) a styrene monomer.

In the (a) component, the alkenylsuccinic acids, alkenylsuccinic anhydrides, alkylsuccinic acids, and alkylsuccinic anhydrides are substituted succinic acids having an alkenyl or alkyl group on a side chain or anhydrides thereof.

The number of carbon atoms of each of the alkenyl group and the alkyl group is preferably four or more, more preferably in the range of 4 to 30, still more preferably 8 to 24.

The (a) component may be produced by any method that can produce a predetermined compound. For example, an alkenylsuccinic acid or an alkenylsuccinic anhydride may be produced by an addition reaction between an α-olefin or internal olefin and maleic acid or maleic anhydride.

The alkenylsuccinic acid or alkenylsuccinic anhydride may be hydrogenated to yield an alkylsuccinic acid or an alkylsuccinic anhydride.

Specific examples of alkenylsuccinic acids and alkenylsuccinic anhydrides include hexenylsuccinic acid, heptenylsuccinic acid, octenylsuccinic acid, nonenylsuccinic acid, decenylsuccinic acid, dodecenylsuccinic acid, tetradecenylsuccinic acid, cyclododecylsuccinic acid, cyclododecenylsuccinic acid, hexadecenylsuccinic acid, heptadecenylsuccinic acid, octadecenylsuccinic acid, pentadecenylsuccinic acid, pentadodecenylsuccinic acid, eicosenylsuccinic acid, tetracosenylsuccinic acid, triacontenylsuccinic acid, tetrapropenylsuccinic acid, triisobutenylsuccinic acid, 1-hexyl-2-decenylsuccinic acid, 1-octyl-2-decenylsuccinic acid, and anhydrides thereof.

Specific examples of alkylsuccinic acids and alkylsuccinic anhydrides include butylsuccinic acid, heptylsuccinic acid, octylsuccinic acid, nonylsuccinic acid, decylsuccinic acid, dodecylsuccinic acid, tetradecylsuccinic acid, hexadecylsuccinic acid, heptadecylsuccinic acid, octadecylsuccinic acid, pentadecylsuccinic acid, pentadodecylsuccinic acid, eicosylsuccinic acid, tetracosylsuccinic acid, and anhydrides thereof.

The (a) component is one or two or more selected from the alkenylsuccinic acids, alkenylsuccinic anhydrides, alkylsuccinic acids, and alkylsuccinic anhydrides.

The (a) component constitutes 5% by mass or more, preferably 5% to 55% by mass, more preferably 10% to 30% by mass, of the total amount of all the monomer component(s) and the (a) component of the composition.

When the (a) component constitutes 5% to 55% by mass, a hydrophilic and hydrophobic balance in the resin for aqueous pigment dispersion can be properly maintained, and the number of coarse particles is effectively reduced.

In the (a) component, since the alkenyl or alkyl group is directly bonded to a carbon atom of succinic acid or anhydride thereof, this results in higher hydrolysis resistance than bonding through an ester bond. Thus, as in an aqueous pigment dispersion according to the present invention described below, when a resin for aqueous pigment dispersion is mixed with a basic compound, even the use of a strong alkali having high neutralizing capacity as the basic compound does not cause the hydrolysis of the alkenyl or alkyl group of the (a) component, and the resin for aqueous pigment dispersion can therefore have high long-term stability.

Examples of the styrene monomer of the (b) component include styrene, α-methylstyrene, divinylbenzene, 4-methylstyrene, 4-t-butylstyrene, 4-n-octylstyrene, sodium styrenesulfonate, 4-vinylbenzoic acid, 4-aminostyrene, 4-methoxystyrene, 4-nitrostyrene, and stilbene, and styrene is preferred. These may be used alone or in combination.

In terms of dispersion stability and long-term storage stability, the (b) component constitutes 30% by mass or more, preferably 30% to 80% by mass, more preferably 50% to 80% by mass, of the total amount of all the monomer component(s) and the (a) component of the composition.

When the (b) component constitutes 30% by mass or more of the total amount of all the monomer component(s) and the (a) component of the composition, the resin for aqueous pigment dispersion becomes more hydrophobic and more strongly covers a pigment in an aqueous medium, thus forming stable particles. Thus, an aqueous ink for ink jet recording resulting from an aqueous pigment dispersion produced using a resin for aqueous pigment dispersion according to the present invention has excellent dispersion stability and rare occurrence of nozzle clogging. Printing on plain paper with such an aqueous ink for ink jet recording can produce images having high water resistance, high density, and excellent coloring.

When the (b) component constitutes 80% by mass or less, it is easy to maintain a proper hydrophilic and hydrophobic balance in the resin for aqueous pigment dispersion.

Thus, a resin for aqueous pigment dispersion according to the present invention is produced by copolymerization of a composition that contains the (a) component, which is effective in maintaining a proper hydrophilic and hydrophobic balance, and the (b) component, which is a hydrophobic monomer component that is effective in covering a pigment. The resin for aqueous pigment dispersion therefore has excellent dispersion stability and long-term storage stability.

Preferably, the composition contains (c) a monomer having an α,β-ethylenically unsaturated bond and an anionic group.

Examples of the monomer having an α,β-ethylenically unsaturated bond and an anionic group include monomers having a carboxy group, such as acrylic acid, methacrylic acid, itaconic acid, and (anhydrous) maleic acid, and monoesters of itaconic acid, and (anhydrous) maleic acid. These may be used alone or in combination.

The (c) component preferably constitutes 5% to 40% by mass, more preferably 5% to 30% by mass, of the total amount of all the monomer component(s) and the (a) component of the composition.

In the present invention, for example, a resin for aqueous pigment dispersion can be produced by a graft reaction of the (b) component or the (b) component and the (c) component in which a radical generated by removal of a hydrogen atom from the (a) component with an organic peroxide acts as a starting point.

The organic peroxide is not particularly limited and may be a peroxide having a carbon atom in its skeleton, preferably a peroxide that can remove a hydrogen atom to generate a radical. Examples of the organic peroxide include benzoyl peroxide, di-t-butyl peroxide, t-butylperoxy-2-ethylhexanoate, t-butylperoxymaleic acid, t-butylperoxyisopropyl monocarbonate, t-hexylperoxybenzoate, and t-butylperoxybenzoate. Among these, di-t-butyl peroxide is particularly preferred. These may be used alone or in combination.

Radical polymerization initiators other than the organic peroxides, for example, azo polymerization initiators, redox polymerization initiators, and photopolymerization initiators may be used provided that the objects of the present invention can be achieved with the radical polymerization initiators.

The graft reaction method may be, but is not limited to, bulk polymerization or solution polymerization, preferably bulk polymerization. The polymerization temperature depends on the type of monomer or polymerization initiator used and is preferably in the range of 50° C. to 200° C.

The solution polymerization may employ an appropriate solvent. Examples of such a solvent include aromatic hydrocarbons having no ethylenically double bond, such as toluene and xylene; saturated aliphatic hydrocarbons, such as hexane, heptane, and octane; saturated alicyclic hydrocarbons, such as cyclohexane, methylcyclohexane, ethylcyclohexane, cycloheptane, and methylcycloheptane; esters having no ethylenically double bond, such as ethyl acetate, n-butyl acetate, and isobutyl acetate; ketones having no ethylenically double bond, such as acetone, 2-butanone, methyl isobutyl ketone, and cyclohexanone; and ethers having no ethylenically double bond, such as n-butyl ether, isobutyl ether, tetrahydrofuran, diethyl ether, ethylene glycol dialkyl ether, and dioxane. These solvents may be used alone or in combination. After the completion of the reaction, the solvent may be removed.

A resin for aqueous pigment dispersion according to the present invention preferably forms a stable coating on a pigment surface in an aqueous medium. In particular, also in the case of an aqueous pigment dispersion prepared by coating a pigment with the resin for aqueous pigment dispersion neutralized with a basic compound, the aqueous pigment dispersion preferably has stable dispersibility in water resulting from the neutralized anionic group. In terms of long-term storage stability, the resin preferably has an acid value in the range of 50 to 300 mg potassium hydroxide (KOH)/g, more preferably 50 to 200 mgKOH/g, particularly preferably 100 to 200 mgKOH/g.

The acid value refers to KOH milligram (mg) required to neutralize 1 g of resin and is expressed in mgKOH/g.

An acid value of less than 50 mgKOH/g may result in low hydrophilicity and poor dispersion stability of the pigment. On the other hand, an acid value of more than 300 mgKOH/g may result in low water resistance of images printed with the ink composition.

The resin for aqueous pigment dispersion preferably has a mass-average molecular weight in the range of 5000 to 30000, more preferably 5000 to 20000, particularly preferably 5000 to 15000. The reason for 5000 or more is that a lower molecular weight tends to initially have higher dispersibility but have poorer long-term storage stability. A mass-average molecular weight of more than 30000 tends to result in a higher viscosity of the aqueous pigment dispersion, poorer dispersibility and solubility of the resin, and poorer ejection stability of an ink jet recording ink, particularly a thermal ink jet recording ink.

Like known resins for improving pigment dispersion, a resin for aqueous pigment dispersion according to the present invention can be used in the preparation of various aqueous pigment dispersions. Aqueous pigment dispersions can be prepared by common procedures using a resin for aqueous pigment dispersion according to the present invention.

Aqueous pigment dispersions prepared using a resin for aqueous pigment dispersion according to the present invention can contain only a few coarse particles. Aqueous pigment dispersions thus prepared also have excellent storage stability. The reason for such effects is not clear but is assumed as described below. A resin for aqueous pigment dispersion according to the present invention has a pendent alkenyl or alkyl group derived from the (a) component. The pendent alkenyl or alkyl group is very stable and is rarely degraded, for example, even in long-term storage in the presence of an alkali. Furthermore, the pendent alkenyl or alkyl group has a high affinity for a pigment and a relatively high degree of flexibility in its structure. Thus, a resin for aqueous pigment dispersion according to the present invention can sufficiently cover a pigment with the pendent alkenyl or alkyl group and effectively prevent the reaggregation of pigment particles.

Aqueous Pigment Dispersion

An aqueous pigment dispersion according to the present invention contains the resin for aqueous pigment dispersion, a pigment, and a basic compound.

Pigment

The pigment in an aqueous pigment dispersion according to the present invention may be a commercial product without modification.

The pigment may be an inorganic pigment, such as carbon black, an azo pigment, a phthalocyanine pigment, an anthraquinone pigment, a quinacridone pigment, a metal complex pigment, a dioxazine pigment, an indigo pigment, a thioindigo pigment, a perylene pigment, an isoindolinone pigment, an aniline black pigment, an azomethine pigment, or an organic pigment, such as a rhodamine B lake pigment.

In general, when an aqueous pigment dispersion is diluted to produce an ink composition having a certain pigment concentration, it is advantageous in terms of production efficiency to maximize the pigment concentration of the aqueous pigment dispersion because this can increase the production of the ink composition.

However, a higher pigment concentration results in reduced storage stability of the aqueous pigment dispersion. Thus, the pigment concentration of the aqueous pigment dispersion may practically be determined with pigment dispersion stability taken into account and is preferably in the range of 5% to 50% by mass, more preferably 5% to 40% by mass, particularly preferably 10% to 30% by mass.

Regarding the mass ratio of resin to pigment (R/P=mass ratio of resin/pigment), the amount of resin necessary to stably cover the pigment surface is sufficient, and the presence of a resin in excess of this amount is unfavorable. In the production of an aqueous pigment dispersion or an ink composition, the presence of an excessive amount of resin results in an increased amount of free resin, which is not adsorbed on the pigment. In particular, when the ink composition is used as an ink jet recording ink composition, the resin is likely to adhere to an ink nozzle and cause ink ejection failure. In particular, a thermal jet printer is at increased risk of causing ejection failure.

Thus, an aqueous pigment dispersion according to the present invention preferably has a resin/pigment mass ratio in the range of 1/10 to 2/1, more preferably 1/10 to 1/1, particularly preferably 1/10 to 1/2. An excessively high resin/pigment mass ratio tends to cause the problem described above. An excessively low resin/pigment mass ratio may result in insufficient coating of the pigment with the resin and poor dispersion stability and long-term storage stability.

Basic Compound

The basic compound in an aqueous pigment dispersion according to the present invention is to neutralize an anionic group of the resin for aqueous pigment dispersion and may be a known basic compound.

Examples of the basic compound include inorganic basic compounds, such as sodium hydroxide, potassium hydroxide, and ammonia, and organic basic compounds, such as triethylamine and alkanolamine. Among these, alkali metal hydroxides, such as sodium hydroxide and potassium hydroxide, are preferred because of their high thermal stability and no odor, and potassium hydroxide is more preferred because of its stronger basicity.

Aqueous Medium

In an aqueous pigment dispersion according to the present invention, an aqueous medium for dispersing or dissolving the pigment, the basic compound, and the resin for aqueous pigment dispersion is water or a mixture of water and a water-soluble organic solvent.

The aqueous medium may be water alone or contain a water-soluble organic solvent that has functions, such as prevention of drying, viscosity control, a wetting agent, and concentration control, for example, in an ink jet recording ink.

Specific examples of such a water-soluble organic solvent include glycols, such as ethylene glycol, diethylene glycol, triethylene glycol, propylene glycol, dipropylene glycol, tripropylene glycol, and polyoxyalkylene adducts thereof; glycerins and derivatives thereof, such as glycerin and diglycerin; polyhydric alcohol ethers, such as diethylene glycol diethyl ether and polyoxyalkylene adducts thereof; acetates; thiodiglycol; nitrogen-containing compounds, such as N-methyl-2-pyrrolidone, 1,3-dimethyl-2-imidazolidinone, and dimethylformamide; and dimethyl sulfoxide. These water-soluble organic solvents may function as wetting agents.

Other Resins

A resin other than the resin for aqueous pigment dispersion according to the present invention may be used without losing the advantages of the present invention. Examples of such a resin include acrylic resins, amino resins, urethane resins, epoxy resins, urea resins, vinyl resins, and polyester resins.

Method for Producing Aqueous Pigment Dispersion According to Present Invention

A method for producing an aqueous pigment dispersion according to the present invention includes a kneading process for kneading a mixture of the resin for aqueous pigment dispersion, a pigment, and a basic compound to produce a pigment dispersion having a solid content of 50% by mass or more and a mixing process for mixing and agitating the pigment dispersion in an aqueous medium. Production by a method for producing an aqueous pigment dispersion according to the present invention can more effectively reduce the occurrence of coarse particles.

In the present specification, in a process for producing a kneaded product for aqueous pigment dispersion, a material before kneading is referred to as a mixture, and a material during kneading or after kneading is referred to as a kneaded product.

A pigment, a basic compound, and an aqueous medium for use in a method for producing an aqueous pigment dispersion according to the present invention may be those described above.

In the kneading process, the resin for aqueous pigment dispersion is preferably powdery or granular. A powdery or granular resin, together with a pigment, experiences strong shear force. The pigment is therefore crushed while the resin for aqueous pigment dispersion is swollen or dissolved by neutralization with a basic compound. Thus, the crushed pigment is rapidly coated with the resin, and kneading proceeds efficiently and satisfactorily.

In a method for producing an aqueous pigment dispersion according to the present invention, the resin for aqueous pigment dispersion is swollen or dissolved by neutralization with a basic compound and is kneaded with a pigment. The basic compound or an aqueous or solvent solution thereof is added to a mixture for kneading in the kneading process. In the case that the basic compound is an inorganic basic compound, the basic compound is generally in the form of an approximately 20% to 50% by mass aqueous solution so as to improve miscibility. This allows a kneaded product to be further kneaded while the resin for aqueous pigment dispersion is neutralized with the basic compound.

In general, the amount of basic compound is such that the neutralization rate of the anionic group of the resin for aqueous pigment dispersion is preferably 50% or more and 200% or less, more preferably 80% or more and 120% or less.

At a neutralization rate within these ranges, it is possible to improve the dispersion rate in the aqueous medium and efficiently maintain dispersion stability and long-term storage stability. The neutralization rate is calculated by the following equation.

$$\text{Neutralization rate (\%)} = ([\text{mass of basic compound (g)} \times 56.1 \times 1000]/[\text{acid value of resin} \times \text{equivalent of basic compound} \times \text{mass of resin (g)}]) \times 100$$

The basic compound is preferably mixed with all the other components of the mixture in one batch before kneading. The mixture may be produced by a plurality of processes by mixing a resin for aqueous pigment dispersion, water, and a basic compound to prepare an aqueous resin solution in advance and adding the aqueous resin solution to the other component(s), such as a pigment. However, it is preferable to mix the basic compound with the other component(s) in one batch to prepare a mixture for kneading because this allows the resin to be efficiently adsorbed on the pigment surface.

In a method for producing an aqueous pigment dispersion according to the present invention, when a resin other than the resin for aqueous pigment dispersion is used, it is preferable to mix the other resin as well as the resin for aqueous pigment dispersion with a pigment and a basic compound before kneading.

Wetting Agent

In the production of a pigment dispersion, kneading is preferably performed in the presence of some solvent. The absence of solvent may result in insufficient kneading, insufficient wetting of the pigment surface, and inadequate coating with a resin.

A wetting agent in a kneaded product for aqueous pigment dispersion can dissolve, partly dissolve, or swell the resin and thereby allows a uniform resin film to be formed on the surface of pigment particles.

This can further improve the dispersion stability of an aqueous pigment dispersion and an ink composition.

Use of an aqueous solution of a basic compound or a liquid basic compound, such as an amine, may obviate the necessity of adding a wetting agent because they can serve as solvents.

The wetting agent may be any known wetting agent.

Examples of the wetting agent include glycols, such as ethylene glycol, diethylene glycol, triethylene glycol, tetraethylene glycol, propylene glycol, poly(ethylene glycol), and poly(propylene glycol); diols, such as butanediol, pentanediol, hexanediol, and homologous diols; glycol esters, such as propylene glycol laurate; glycol ethers, such as diethylene glycol monoethyl ether, diethylene glycol monobutyl ether, diethylene glycol monohexyl ether, propylene glycol ether, dipropylene glycol ether, and cellosolve containing triethylene glycol ether; alcohols, such as methanol, ethanol, isopropyl alcohol, 1-propanol, 2-propanol, 1-butanol, 2-butanol, pentanol, and homologous alcohols; sulfolane; lactones, such as γ-butyrolactone; lactams, such as N-(2-hydroxyethyl)pyrrolidone; glycerin and glycerin derivatives, such as polyoxyalkylene adducts of glycerin; and other various solvents known as water-soluble organic solvents.

These wetting agents may be used alone or in combination. The wetting agent is selected according to the type of resin used and preferably the resin has some solubility in the wetting agent. The amount of wetting agent depends on the solubility of the resin.

Among others, polyhydric alcohols that are liquid at normal temperature and have a high boiling point, low volatility, and high surface tension are preferred because the polyhydric alcohols also serve as wetting agents and anti-drying agents in an aqueous pigment dispersion or an ink composition. Glycols, such as diethylene glycol and triethylene glycol, are particularly preferred. Glycols are generally present in ink compositions and may be present in end products without problems. In particular, in a production method according to the present invention, kneading in the presence of a basic compound obviates the necessity of a water-soluble organic solvent particularly having high solvent power for a resin.

Depending on the type of resin used, the wetting agent preferably constitutes 10% to 50% by mass, more preferably 20% to 40% by mass, of a mixture to be kneaded.

The amount of wetting agent is preferably in the range of approximately 1/2 to five times, more preferably approximately one to four times, the amount of resin. When the amount of wetting agent is less than 1/2 of the amount of resin, it may be impossible to dissolve, partly dissolve, or swell the resin, and this may result in poor dispersion stability of the pigment.

On the other hand, when the amount of wetting agent is more than five times the amount of resin, this may result in a reduced viscosity of a mixture for kneading, inefficient kneading, poor pigment dispersion, and poor image quality, such as ejection failure, in an ink composition.

In the presence of a component serving as a solvent derived from an aqueous solution of a basic compound, as described above, the amount of wetting agent is preferably determined with such a component taken into account.

The mass ratio of the wetting agent to the pigment is preferably 1/5 or more, more preferably in the range of 1/3 to 1. This allows the kneading process to proceed while the resin is continuously in a partially dissolved or swollen state, allowing the pigment surface to be adequately coated with the resin. When the mass ratio of the wetting agent to the pigment is less than 1/5, it may be impossible to sufficiently wet the pigment surface in the early stages of kneading or dissolve, partly dissolve, or swell the resin, and the wetting agent may have insignificant effects.

In a method for producing an aqueous pigment dispersion according to the present invention, kneading is preferably performed while the solid content of a kneaded product in the kneading process is maintained in the range of 50% to 80% by mass.

When kneading is performed while such a solid content is maintained, the resin and the pigment are kneaded with strong shear force from the start to the end of kneading, the pigment is crushed into a fine powder having a reduced particle size, and the pigment surface is effectively coated with the resin.

This can significantly improve the dispersion stability and the long-term storage stability of the ink composition. A solid content of 50% by mass or more results in an increased viscosity of the mixture, which allows high-shear kneading and efficient crushing of the pigment, preventing the aqueous pigment dispersion from being contaminated with coarse particles.

A solid content of more than 80% by mass may result in an excessively hard mixture, which makes kneading difficult and pigment dispersion insufficient. Furthermore, it may be difficult to disperse a kneaded product in an aqueous medium after kneading. The solid content may be controlled with water as well as the wetting agent.

After kneading at such a solid content, the liquid components, such as the wetting agent, constitute at least 20% by mass of the kneaded product. Thus, after kneading, only the addition of an aqueous medium and agitation allow the kneaded product to be dispersed in the aqueous medium in a very short time. This improves production efficiency.

In a method for producing an aqueous pigment dispersion according to the present invention, use of a closed system kneader is preferred because this can prevent the vaporization of an aqueous medium and an increase in solid content during kneading, allowing kneading to proceed in a particular solid content range. This also allows the total amount of aqueous medium and the mass of the solid kneaded product to be substantially unchanged during kneading.

Thus, a certain amount of aqueous medium remains in the kneaded product after kneading, allowing the kneaded product to be easily dispersed in the aqueous medium in the mixing process.

The closed system, as used herein, does not necessarily refer to a completely closed state. There is no need for kneading in a closed state that is completely isolated from the outside air and produces a vacuum.

A closed system kneader in the present invention is a kneader having a closable kneading area, in which the mass of a kneaded product is maintained in the range of 90% by mass or more during kneading.

Such a closed system kneader preferably includes a mixing vessel and a single or multiple impellers. The number of impeller blades is not particularly limited and is preferably two or more so as to perform sufficient kneading.

Unlike two-roll mills or three-roll mills, the state of a raw material at the start of kneading in such a kneader is not particularly limited. A liquid or solid raw material may be directly charged into and mixed in a mixing vessel and may be directly transferred to the kneading process.

Use of such a kneader allows the kneaded product to be directly diluted with and dispersed in an aqueous medium in the same mixing vessel to reduce the viscosity of the kneaded product before transferring the kneaded product to the dispersion process. This can improve production efficiency.

Examples of such a kneader include a Henschel mixer, a pressurized kneader, a Banbury mixer, and a planetary mixer.

A production apparatus for use in a method for producing an aqueous pigment dispersion according to the present invention is particularly preferably a planetary mixer.

In a method for producing an aqueous pigment dispersion according to the present invention, the viscosity of a kneaded product widely varies with the kneading state of the kneaded product. A planetary mixer can treat kneaded products having various viscosities from low viscosity to high viscosity, has less dead space in the mixing vessel, and can uniformly knead and agitate a kneaded product in the mixing vessel from material charging to kneading and to dilution of the kneaded product. This can improve production efficiency.

A pigment dispersion produced in the kneading process is then dispersed in an aqueous medium to produce an aqueous pigment dispersion. The pigment in the pigment dispersion is crushed during kneading of the kneaded product in the kneading process and is coated with a resin for aqueous pigment dispersion neutralized with a basic compound. Thus, because of its high dispersibility in water, the pigment is rapidly dispersed in an aqueous medium in the mixing process. This can improve production efficiency.

Although the production of an aqueous pigment dispersion for ink jet recording according to the present invention does not necessarily require a dispersion process using a dispersing apparatus, a known dispersing apparatus may be used in the dispersion process. Examples of a dispersing apparatus having a dispersing medium include paint shakers, ball mills, attritors, basket mills, sand mills, sand grinders, Dyno-Mill, Dispermat, SC mills, spike mills, and agitator mills. Examples of a dispersing apparatus having no dispersing medium include ultrasonic homogenizers, Nanomiser, dissolvers, dispers, and high-speed impeller dispersing apparatuses. Among these, dispersing apparatuses having a dispersing medium are preferred because of their high dispersing ability. After dispersion, the concentration may be adjusted with an aqueous medium, if necessary.

In the preparation of an aqueous pigment dispersion, various known additive agents, such as a basic compound, may be added as required.

The addition of a basic compound is preferred because this improves dispersion stability.

Ink Jet Recording Ink

An ink jet recording ink according to the present invention can be produced by diluting an aqueous pigment dispersion produced as described above with an aqueous medium. The pigment concentration of the ink jet recording ink is preferably in the range of approximately 2% to 10% by mass.

An aqueous medium for diluting an aqueous pigment dispersion may be water alone or a wetting agent, which can prevent drying and control the viscosity and concentration.

The addition of a water-soluble organic solvent that can permeate a recording medium to the aqueous medium is preferred because the water-soluble organic solvent can impart penetration ability to the ink composition.

The ink jet recording ink may further contain known additive agents. Examples of such additive agents include alkaline agents, pH-adjusting agents, surfactants, preservatives, chelating agents, plasticizers, antioxidants, ultraviolet absorbers, and ultraviolet-curable resins.

An ink jet recording ink according to the present invention can be suitably used as an aqueous ink jet recording ink containing a pigment. An ink jet recording ink according to the present invention may be used for any ink jet method and may be used in printers of known types, such as continuous ejection types (such as a charge control type and a spray type) and on-demand types (such as a piezoelectric type, a thermal type, and an electrostatic attraction type). In particular, an ink jet recording ink according to the present invention may be suitably used in thermal ink jet printers and exhibits excellent dispersion stability, storage stability, and very stable ink ejection.

EXAMPLES

Although the present invention will be further described in the following examples, the present invention is not limited to these examples. Unless otherwise specified, "parts" refers to "parts by mass", and "%" refers to "% by mass".

Measurement of Acid Value of Resin (Total acid value: measurement method involving ring opening of acid anhydride)

The acid value of resin was measured as described below.

30 ml of 1,4-dioxane, 10 ml of pyridine, and 20 mg of 4-dimethylaminopyridine are added to 2.0 g of a resin and are heated to dissolve the resin for 30 minutes to one hour. After 3.5 ml of ion-exchanged water is added to the mixture, the mixture is refluxed for four hours.

After cooling, two to three drops of 1% phenolphthalein in ethanol are added as an indicator, and the mixture is titrated with 0.5 N potassium hydroxide in ethanol. The indicator assumed pale red for 30 seconds at the titration endpoint.

Acid value=V×F×28.05/S

V: the amount of 0.5 N potassium hydroxide in ethanol used (ml)

F: the titer of 0.5 N potassium hydroxide in ethanol

S: the amount of sample (g)

Measurement of Molecular Weight of Resin

The mass-average molecular weight was measured with a GPC apparatus (manufactured by Tosoh Corp., HLC-8120 GPC) using separation columns of two TSK-GEL GMH HR-H columns manufactured by Tosoh Corp. at a column temperature of 40° C., 0.1% by mass tetrahydrofuran as a solvent, and a 0.5 µm filter, at a flow rate of 1 ml/min. The polystyrene equivalent molecular weight was determined using standard polystyrenes.

(Resin Synthesis Example 1)

20 parts by mass of octadecenylsuccinic anhydride was charged into a reaction vessel equipped with a thermometer, a Liebig condenser tube, a stirrer, a dropping funnel, and a nitrogen inlet and was heated to 175° C. while the reaction vessel was purged with nitrogen. A mixed solution of 69 parts by mass of styrene, 11 parts by mass of acrylic acid, and 2 parts by mass of di-t-butyl peroxide serving as an initiator was added dropwise to the reaction vessel through the dropping funnel for five hours. The mixture was kept warm for two hours after the dropwise addition and was then heated to 193° C. at a reduced pressure of 10 hPa for one hour to evaporate unreacted raw materials, thus yielding a resin 1 for aqueous pigment dispersion. The resin 1 had a mass-average molecular weight of 7320 and an acid value of 142 mgKOH/g.

(Resin Synthesis Examples 2 to 13): Resins 2 to 13

Resins 2 to 13 for aqueous pigment dispersion were prepared in the same manner as the resin 1 except that the compounds, monomers, and mass parts were changed as described in the (a) component, the (b) component, the (c) component, and the other monomers in Table 1. The amount of initiator was appropriately changed to control molecular weight. Table 1 shows the physical properties of the resins 2 to 13.

In Table 1, St denotes styrene, AA denotes acrylic acid, MAA denotes methacrylic acid, and BA denotes butyl acrylate.

TABLE 1

| Resin No. | (a) component | (b) component | (c) component | Another monomer | Acid value | Molecular weight |
|---|---|---|---|---|---|---|
| 1 | $C_{18}$alkenylsuccinic anhydride 20 parts | St 69 parts | AA11 parts | | 142 | 7,320 |
| 2 | $C_{18}$alkenylsuccinic anhydride 20 parts | St 66 parts | MAA14 parts | | 149 | 7,010 |
| 3 | $C_{18}$alkenylsuccinic anhydride 10 parts | St 75 parts | AA15 parts | | 145 | 8,300 |
| 4 | $C_{24}$alkenylsuccinic anhydride 20 parts | St 68 parts | AA12 parts | | 142 | 7,980 |
| 5 | $C_{8}$alkenylsuccinic anhydride 20 parts | St 74 parts | AA6 parts | | 145 | 8,400 |
| 6 | $C_{18}$alkenylsuccinic anhydride 20 parts | St 64 parts | AA16 parts | | 182 | 7,500 |
| 7 | $C_{18}$alkenylsuccinic anhydride 20 parts | St 75 parts | AA5 parts | | 95 | 7,700 |
| 8 | $C_{18}$alkenylsuccinic anhydride 20 parts | St 69 parts | AA11 parts | | 143 | 12,500 |
| 9 | $C_{18}$alkenylsuccinic anhydride 20 parts | St 69 parts | AA11 parts | | 142 | 5,300 |
| 10 | $C_{18}$alkenylsuccinic anhydride 20 parts | St 67 parts | AA11 parts | BA 2 parts | 142 | 7,200 |
| 11 | $C_{18}$alkenylsuccinic anhydride 2 parts | St 89 parts | AA19 parts | | 145 | 7,410 |
| 12 | maleic anhydride (C = 0) 10 parts | St 86 parts | AA4 parts | | 149 | 7,860 |
| 13 | None | St 79 parts | AA21 parts | | 149 | 7,470 |

Example 1

Pigment Dispersion Process with Planetary Mixer 1500 parts by mass of the resin 1 prepared in synthesis example 1, 5000 parts by mass of FASTOGEN BLUE TGR (Pigment Blue 15:3) (manufactured by DIC Corp.), 399 parts by mass of diethanolamine, and 2300 parts by mass of diethylene glycol were charged into a 50-L planetary mixer PLM-V-50V (manufactured by Inoue Manufacturing Co., Ltd.). While the jacket was heated, the mixture was kneaded at a low speed (the number of rotations: 21 rpm, the number of revolutions: 14 rpm) until the temperature of the contents reached 60° C. After the temperature of the contents reached 60° C., kneading was continued at a high speed (the number of rotations: 35 rpm, the number of revolutions: 24 rpm).

15 minutes after the planetary mixer had the maximum load current upon switching to the high speed, the load current of the planetary mixer was decreased and leveled off. Kneading was continued in this state another three hours to yield a kneaded product. 500 parts by mass of ion-exchanged water was added to the kneaded product in the mixing vessel and was continuously kneaded. After ensuring that the kneaded product was homogeneous, another 500 parts by mass of ion-exchanged water was added to the kneaded product and was kneaded until the kneaded product became homogeneous. The viscosity of the kneaded product was then adjusted. In the same manner, 500 parts by mass of ion-exchanged water was repeatedly added to the kneaded product such that the total amount of ion-exchanged water was 4000 parts by mass. While kneading was continued, the amount of ion-exchanged water added at a time was increased to 1000 parts by mass. While ensuring that the kneaded product was homogeneous, as described above, another 4000 parts by mass of ion-exchanged water in total was added to the kneaded product.

1700 parts by mass of diethylene glycol, 14000 parts by mass of ion-exchanged water, and 33 parts by mass of a preservative were then added to the kneaded product and were stirred. The pigment concentration was then adjusted to 15% by mass with ion-exchanged water. The resulting aqueous pigment dispersion was removed from the planetary mixer.

Centrifugation Process

The aqueous pigment dispersion was continuously centrifuged in a continuous centrifuge (H-6005 manufactured by Kokusan Enshinki Co., Ltd., capacity 2 L) at room temperature at a centrifugal force of 18900 G at a residence time of 12 minutes. After the dispersion was collected, ion-exchanged water was added to the dispersion such that the pigment concentration was 13.5% by mass, yielding an aqueous pigment dispersion according to Example 1.

Example 2

An aqueous pigment dispersion according to Example 2 was prepared in the same manner as in Example 1 except that 399 parts by mass of diethanolamine was replaced by 626 parts by mass of 34% by mass aqueous potassium hydroxide.

Aqueous pigment dispersions according to Examples 3 to 13 and Comparative Examples 1 to 3 were prepared as described above using the compositions listed in Table 2. In Table 2, R/P denotes the mass ratio of resin to pigment.

TABLE 2

| | Resin No. | Acid value | R/P | Pigment | Resin | 34% KOH | Diethanolamine |
|---|---|---|---|---|---|---|---|
| Example 1 | Resin 1 | 142 | 0.3 | 5000 | 1500 | | 399 |
| Example 2 | Resin 1 | 142 | 0.3 | 5000 | 1500 | 626 | |
| Example 3 | Resin 1 | 142 | 0.4 | 5000 | 2000 | 835 | |
| Example 4 | Resin 1 | 142 | 0.2 | 5000 | 1000 | 418 | |
| Example 5 | Resin 2 | 149 | 0.3 | 5000 | 1500 | 657 | |
| Example 6 | Resin 3 | 145 | 0.3 | 5000 | 1500 | 640 | |
| Example 7 | Resin 4 | 142 | 0.3 | 5000 | 1500 | 627 | |
| Example 8 | Resin 5 | 145 | 0.3 | 5000 | 1500 | 640 | |
| Example 9 | Resin 6 | 182 | 0.3 | 5000 | 1500 | 803 | |
| Example 10 | Resin 7 | 95 | 0.3 | 5000 | 1500 | 419 | |
| Example 11 | Resin 8 | 143 | 0.3 | 5000 | 1500 | 631 | |
| Example 12 | Resin 9 | 142 | 0.3 | 5000 | 1500 | 627 | |
| Example 13 | Resin 10 | 142 | 0.3 | 5000 | 1500 | 627 | |
| Comparative example 1 | Resin 11 | 145 | 0.3 | 5000 | 1500 | 640 | |
| Comparative example 2 | Resin 12 | 149 | 0.3 | 5000 | 1500 | 657 | |
| Comparative example 3 | Resin 13 | 149 | 0.3 | 5000 | 1500 | 657 | |

Table 3 shows the characteristics of the aqueous pigment dispersions according to Examples 1 to 13 and Comparative Examples 1 to 3 measured by the following test methods.

Volume-Average Particle Size

The particle size of the aqueous pigment dispersions according to the examples and comparative examples was measured with a MICROTRAC UPA150EX particle size analyzer (manufactured by Nikkiso Co., Ltd.) at a cell temperature of 25° C. A sample for particle size measurement was prepared by diluting each of the aqueous pigment dispersions with ion-exchanged water to a pigment concentration of 12.5% by mass and then 500-fold with ion-exchanged water.

Number of Coarse Particles

The number of coarse particles was measured with ACCU-SIZER 780 (Particle Sizing Systems, Inc.). A sample for the measurement of the number of coarse particles was prepared by decreasing the pigment concentration with 200- to 10000-fold ion-exchanged water such that the number of counts of coarse particles having a particle size of 0.5 μm or more was in the range of 1000 to 4000 when the sample passed through a detector at 1 ml/s.

The number of coarse particles in 1 ml of an aqueous pigment dispersion having a pigment concentration of 12.5% by mass was calculated with the dilution ratio taken into account.

Storage Stability

Storage stability was evaluated with aqueous pigment dispersions according to the examples and comparative examples stored at 60° C. Storage stability was evaluated on the basis of a difference between the initial particle size before the start of the test and the particle size six weeks after the start of the test. The evaluation criteria were as follows:
- Double circle: 5% or less,
- Circle: more than 5% and 10% or less,
- Triangle: more than 10% and 20% or less, and
- Cross: more than 20%.

Ink Jet Ejection Stability
(Preparation of Test Ink)

5 parts of diethylene glycol, 5 parts by mass of SANNIX GP-600 (manufactured by Sanyo Chemical Industries, Ltd.), 3 parts by mass of glycerin, and 63.9 parts by mass of ion-exchanged water were added to 23.1 parts by mass of each of the aqueous pigment dispersions according to the examples and comparative examples and were uniformly stirred to prepare an aqueous ink for ink jet recording having a pigment concentration of 3% by mass.

(Ejection Test): Immediately after Ink Preparation

The aqueous ink for ink jet recording thus prepared was tested with an ink jet printer (PHOTOSMART D5360 manufactured by HP Co.). After a cartridge for black was filled with an ink, a nozzle check pattern was printed at the start of the test. After printing at a print density of 100% in a monochrome mode in a 340-cm$^2$ area on one A4 sheet, a nozzle check pattern was printed. The states of the nozzle before and after the test were compared. The evaluation criteria were as follows:
- Double circle: no nozzle chipping,
- Circle: no increase in nozzle chipping,
- Triangle: an increase in nozzle chipping by 1 to 5 points, and
- Cross: an increase in nozzle chipping by 6 points or more.

(Ejection Test): After Storage

After the test was performed immediately after ink preparation, the cartridge filled with the test ink was left to stand for four weeks. The printing test performed immediately after the preparation was then performed again.

Table 3 shows that the volume-average particle sizes of the aqueous pigment dispersions according to Examples 1 to 13 were substantially the same as the volume-average particle sizes of the aqueous pigment dispersions according to Comparative Examples 1 to 3.

However, the number of coarse particles before centrifugation was smaller in the aqueous pigment dispersions according to Examples 1 to 13 than in the aqueous pigment dispersions according to Comparative Examples 1 to 3. Even under the same centrifugation conditions, the number of coarse particles after centrifugation was reduced more in the aqueous pigment dispersions according to Examples 1 to 13 than in the aqueous pigment dispersions according to Comparative Examples 1 to 3.

Among the examples, the aqueous pigment dispersions according to Examples 2, 3, 9, and 13, which contained a particularly few coarse particles, were shown to have better storage stability.

The ink jet recording inks prepared using the aqueous pigment dispersions according to Examples 1 to 13 were shown to have better ejection stability than the ink jet recording inks prepared using the aqueous pigment dispersions according to Comparative Examples 1 to 3.

A resin for aqueous pigment dispersion according to the present invention can be used to produce an aqueous pigment dispersion that contains only a few coarse particles and has excellent storage stability. The aqueous pigment dispersion is suitably used to produce an ink jet recording ink having excellent ejection stability.

The invention claimed is:

1. An aqueous pigment dispersion for ink jet recording ink, comprising:
   a resin produced by copolymerization of a composition that contains
   (a) one or two or more compounds selected from the group consisting of alkenylsuccinic acids, alkenylsuccinic anhydrides, alkylsuccinic acids, and alkylsuccinic anhydrides,
   (b) a styrene monomer,
   (c) a monomer having an αβ-ethylenically unsaturated bond and an anionic group,

TABLE 3

| | | Before centrifugation | After centrifugation | | Immediately after | |
| --- | --- | --- | --- | --- | --- | --- |
| | Volume-average particle size (nm) | Number of coase particles (×10$^6$/ml) | Number of coase particles (×10$^6$/ml) | Storage stability | ink preparation Ink jet ejection stability | After storage Ink jet ejection stability |
| Example 1 | 124 | 12700 | 422 | ○ | ○ | ○ |
| Example 2 | 103 | 10500 | 175 | ◎ | ◎ | ◎ |
| Example 3 | 106 | 10600 | 191 | ◎ | ◎ | ◎ |
| Example 4 | 111 | 12200 | 263 | ○ | ◎ | ○ |
| Example 5 | 115 | 13200 | 354 | ○ | ○ | ○ |
| Example 6 | 104 | 11500 | 290 | ○ | ○ | ○ |
| Example 7 | 105 | 11400 | 372 | ○ | ○ | ○ |
| Example 8 | 112 | 12500 | 424 | ○ | ○ | ○ |
| Example 9 | 101 | 9500 | 211 | ◎ | ◎ | ◎ |
| Example 10 | 115 | 13300 | 302 | ○ | ○ | ○ |
| Example 11 | 110 | 12600 | 233 | ○ | ◎ | ○ |
| Example 12 | 105 | 11200 | 227 | ○ | ◎ | ◎ |
| Example 13 | 104 | 10800 | 193 | ◎ | ◎ | ◎ |
| Comparative example 1 | 110 | 26000 | 1840 | ○ | ○ | X |
| Comparative example 2 | 110 | 28000 | 2160 | ○ | ○ | X |
| Comparative example 3 | 110 | 30000 | 2390 | ○ | ○ | X | wherein the (a) component constitutes 5% by mass or more and the (b) component constitutes 30% by mass or more of the total amount of all the monomer component(s) and the (a) component of the composition;

5 to 50% by mass of a pigment; and a basic compound, wherein the aqueous pigment dispersion has a resin/pigment mass ratio of 1/10 to 2/1, wherein the aqueous pigment dispersion is prepared by a method comprising: kneading the resin with the pigment, which is then diluted with an aqueous medium, wherein a pigment particle of the pigment is covered with the resin in the aqueous pigment dispersion, wherein the basic compound neutralizes the anionic group included in the resin.

2. The aqueous pigment dispersion according to claim 1, wherein the aqueous pigment dispersion is used for ink jet recording, and the resin for aqueous pigment dispersion has a mass-average molecular weight in the range of 5000 to 30000.

3. The aqueous pigment dispersion according to claim 1, wherein the basic compound is an alkali metal hydroxide.

4. An ink jet recording ink, comprising an aqueous pigment dispersion according to claim 1.

5. A method for producing an aqueous pigment dispersion, comprising: a kneading process for kneading a mixture of a resin for aqueous pigment dispersion according to claim 1, a pigment, and a basic compound to produce a pigment dispersion having a solid content of 50% by mass or more and a mixing process for mixing and agitating the pigment dispersion in an aqueous medium.

6. The method for producing an aqueous pigment dispersion according claim 5, wherein the basic compound is an alkali metal hydroxide.

7. The aqueous pigment dispersion according to claim 1, wherein the aqueous pigment dispersion includes the basic compound at an amount such that the neutralization rate of the anionic group of the resin for aqueous pigment dispersion is between 50% and 200%.

8. The aqueous pigment dispersion according to claim 1, wherein the monomer (c) having the αβ-ethylenically unsaturated bond and the anionic group is selected from the group consisting of acrylic acid, methacrylic acid, itaconic acid, and (anhydrous) maleic acid.

* * * * *